R. R. GRAVES.
PEDIGREE RECORD AND PROCESS OF MAKING THE SAME.
APPLICATION FILED MAY 21, 1920.
1,364,049.       Patented Dec. 28, 1920.
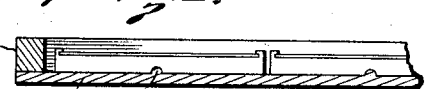
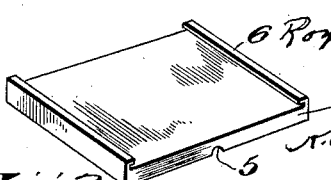

UNITED STATES PATENT OFFICE.

ROY R. GRAVES, OF BETHESDA, MARYLAND.

PEDIGREE-RECORD AND PROCESS OF MAKING THE SAME.

1,364,049.  Specification of Letters Patent.  Patented Dec. 28, 1920.

Application filed May 21, 1920. Serial No. 383,302.

*To all whom it may concern:*

Be it known that I, ROY R. GRAVES, a citizen of the United States, residing at Bethesda, in the county of Montgomery and State of Maryland, have invented certain new and useful Improvements in Pedigree-Records and Processes of Making the Same, of which the following is a specification.

This invention relates to pedigree records and process of making the same and it comprises a pedigree record made up of a number of individual and separate records of ancestors and descendants with the individual and separate records of the ancestors arranged in echelon arrangement with respect to the records of the descendants and it consists also in establishing and maintaining separate and individual records of ancestors and descendants and arranging individual records in readable relation to each other in direct order of consanguinity and advantageously, making a photograph of the arrangement; all as more fully hereinafter set forth and as claimed.

As is well known, the prospective purchaser of an animal is interested in its pedigree and frequently the price of the animal is set in accordance with the records of its ancestors. For instance, in purchasing a calf or a cow, the purchaser is desirous of learning of the performance of the particular cow or the particular calf's sire and dam and, indeed, is interested also in tracing the pedigree back further than one generation and in learning of the performance of the sires and dams of the direct ancestors of the animal in which he is interested.

There are national breed associations representing each breed of cattle, sheep, swine and horses. These associations register all pure-bred animals in their respective breeds and these registrations are published each year in volumes called herd books. When an animal is registered, the breed association issues the breeder a registration certificate, bearing the name of the animal, its herd book number, the names and herd book numbers of the animal's sire and dam, the date of birth, distinguishing marks, and the name and address of the breeder. This same information is published in the herd books.

If a person has the herd book number of any particular animal, he may turn to the herd book containing that number and ascertain the name of the animal and the name and herd book numbers of the animal's sire and dam. By referring to other volumes and each time looking up the herd book number of the sire and dam, the complete ancestry of any given animal may be traced for many generations. In addition to registering animals the dairy cattle breed associations have departments that keep records of production of animals in their respective breeds that are placed on test in compliance with rules established by the breed association. When a breeder places a cow on test he weighs and keeps a record of the weights of each milking. At the end of each month the breeder forwards this record for each cow to the breed association. One each month a representative of the State agricultural college visits the breeder's farm and takes samples of milk from each milking from each cow on test for two days. These samples are tested for the percentage butterfat. The average percentage butterfat secured for the two days is taken as the average for the month. From this supervisor's report and from the breeder's record of milk production, the breed association computes the amount of butterfat produced by the cow during the month. At the end of the year the record is completed. The completed records are published by the respective breed associations from time to time in breed publications, bulletins, and in book form. In making pedigrees the usual method is to look up the ancestry of an animal by referring to the various herd books, and then add the records of the various animals in the ancestry and their progeny, these records being secured from the various publications in which these records have been published.

Since a cow may be the maternal ancestor of different calves with different paternal ancestors and since inbreeding is not infrequent, it is at once apparent that there is considerable difficulty in keeping the records and particularly in tracing pages. The different pages of the books must be referred to and indexes have to be frequently consulted.

In accordance with my invention I make a permanent but individual and separate record of each animal upon a card or similar article, such record including the particular performance of the animal and data in regard to the same with photograph of the animal thereof, if desired. These individual records, I then arrange flatwise with the record of the particular animal whose pedigree is to be traced, adjacent the record of its sire and its dam, and with the records of their sire and dam in turn similarly arranged. I then take a photograph of this flatwise arrangement of the cards or similar articles and am enabled to produce a permanent record from such arrangement.

I may thus easily produce the pedigree of any given animal eliminating all side issue and tracing it back direct through its sires and dams as far as may be desired.

The separate and individual records of the sire may include short descriptions of the particular animal and descriptions of his issue with the names or registered numbers of them, and the record of the dam may include the name and register number with the name or register number of her issue; and the record of the dam, particularly when it is a cow, may advantageously include a description of her performance, such as the quantity of milk given at stated intervals, with the amount of fat and the equivalent of the butter that fat would make. The records may also, if desired, contain description of the show ring winnings and sale prices of the particular animal in question. In other words, referring particularly to the dam of a calf which is to be traced, I establish and maintain separate and individual records of her dam or the cow from which she came, giving the performance of the cow or dam, and in turn I establish and maintain separate records of that particular cow's sire and dam; I then establish and maintain separate and individual records of the bull including particularly the performance of his daughters, and breeding records of his sons, and I establish and maintain individual and separate records of the sire and dam of that particular bull, and so on.

In the case of race horses and the like whose pedigree are to be traced, the records may well include measurements and the like of the particular animal and its performance in races and the ages to which the ancestors lived.

Advantageously, the separate and individual record of each animal is written on a card which may be easily filed in a card index, all the cards being of uniform size and shape. When a permanent pedigree record is to be made the cards containing the records of the ancestors of the particular animal are placed flatwise, preferably in echelon arrangement in a frame or other suitable receptacle, and advantageously in separate sub-receptacles adapted to hold them. The frame may be provided with a plurality of tongues in the bed thereof and the sub-receptacles may consist of similar plates or the like with upwardly projecting grooved sides into which the cards may be placed, the bottom of said sub-receptacle being provided with a groove adapted to fit the longitudinal tongue of the frame or the main receptacle. I may thus slide the different sub-receptacles along on the tongues in such a way that they may be substantially centered in the frame regardless of the number of generations to be traced, and I make a photograph or protostat thereof.

This gives me a permanent record when the photograph is properly developed. The same frame or receptacle therefor may serve for the reproduction of any pedigree, even where, as frequently happens, the same set of cards or records are used in different relations.

In the accompanying drawings I have shown one form of a specific embodiment of the apparatus useful in the performance of my process and within the purview of my invention. Referring to the drawings, Figure 1 is a top plan view of the frame with the sub-receptacles or card holders therein;

Fig. 2 is a segmental vertical section along line 2—2 of Fig. 1, and

Fig. 3 is a perspective view of a sub-receptacle or card holding block.

In the drawing, the frame comprises the bottom section 1 having the upwardly extending tongues 2 and the sides and ends 3. The sub-receptacle or card holding device 4 is provided with the groove 5 and the upwardly extending grooved sides 6. The grooves 5 are adapted to fit over the tongues 2 of the main frame and the groove side 6 arranged for the reception and retention of a card.

A typical card is shown at 8 in Fig. 1.

In operation if, the pedigree of a calf known as King Segis Pontiac Hero registered as No. 78,210 is to be traced, the card having the description of that particular animal, shown as card 7, is placed in a sub-receptacle or card holding device 4 and that device is substantially centered in the frame in the first groove thereof. Its sire was King Segis Pontiac No. 44,444. This animal had a certain number of sons and daughters. Since the farmer or breeder is particularly interested in the performance of the daughters, their ages at which record is made are given on the card in the left hand column, their names are given on the next column and an average of the milk fat, and the equivalent of the butter that fat would make are given in the next three columns.

The dam of King Segis Pontiac Hero was K. P. Lilith Clothilde 110,228 who had two sons, one of them being named King Segis Pontiac Count and the other being named King Segis Pontiac Hero, the calf in which, for the purpose of illustration, we are particularly interested. This dam at the age given in the left hand column of the card in 7 days produced 469.8 pounds of milk, 23.23 pounds of fat (which would be the equivalent of 29.04 pounds of butter) and at the same age in 30 days produced 2348. pounds of milk, 96.52 pounds of fat (which is the equivalent of 120.64 pounds of butter). At 4 years of age in 365 days she produced 22230 pounds of milk, 834.62 pounds of fat (which is the equivalent of 1,043.27 pounds of butter.) This information is all arranged on the card as shown, together if desired, with the picture of the dam.

The card of the sire of the calf whose pedigree is to be traced is placed in the sub-receptacle 4 and that receptacle is placed in the main frame as shown at 8; the card of the dam of the particular calf whose pedigree is to be traced is placed in another sub-receptacle and that is placed in the frame as indicated at 9.

In event it is desired to trace the pedigree back another or other generations, cards containing information regarding the sire and dam of King Segis Pontiac No. 44,444 are placed respectively as at 10 and 11, while the card containing information regarding the sire and dam of K. P. Lilith Clothilde No. 110,228 are placed respectively at 12 and 13. The cards of the sire and dam of the animal shown at 10 are placed respectively at 14 and 15, the cards showing the records of the sire and dam of the animal at 11 are placed at 16 and 17 respectively, the cards showing the records of the sire and dam of the sire shown at 12 are placed at 18 and 19 respectively, and the cards showing the record of the sire and dam of the same shown at 13 are placed at 20 and 21, and so on.

The photograph corresponding to the arrangement of Fig. 1 is then made, thus establishing a permanent negative from which many copies may be made. This arrangement permits quick reproduction of pedigrees from the same cards.

It could easily be that the dam shown at 9 (K. P. Lilith Clothilde) might be sired by the sire shown for instance at 10 or 14. In this event the card 10 or 14 will be arranged where the card 8 is shown in Fig. 1 and the other cards arranged in the proper order of consanguinity. It will thus be seen that any pedigree may be readily permanently produced by the use of the apparatus shown or by my particular process.

It is to be understood that my invention is not limited to reproducing pedigrees of cows, but that records of any animal may be kept and reproduced in accordance with my process.

What I claim is:—

1. The process of producing permanent pedigree records which comprises separately establishing and maintaining individual photographical records of ancestors and descendants, arranging substantially flatwise the separate individual record of a descendant adjacent the separate individual record of the maternal and paternal ancestor to one or more generations in accordance with the extent to which the pedigree is to be traced and photographing the so arranged individual records to make a unitary permanent record therefrom.

2. Process of making permanent pedigree reproductions which consists in making an individual and separate record of the sire and the dam, the record of the dam including its performance and data regarding its issue, and the record of the sire including data regarding its issue, establishing and maintaining separate records of the issue of both the sire and the dam and their issue to as many generations as desired, arranging the individual records as regards any one of the issue alongside each other so that the pedigree may be traced in accordance with such arrangement, side issues being eliminated from the arrangement, and photographing the individual records so arranged to make a permanent record thereof, whereby any issue of any generation may be traced back to any ancestor without reference to the collateral issue.

3. The process of making permanent pedigree records of animals which comprises establishing and maintaining separate and individual records of the sire, including short descriptions of his issue, establishing and maintaining separate and individual records of the dam, including short descriptions of her issue and her performance, establishing and maintaining individual separate records of the issue of the sire and of the dam and arranging the separate individual records in a position whereby they may be photographed with the individual record of any issue adjacent its direct sire and dam, and photographing the individual records so arranged to make a permanent record thereof.

4. The process of making permanent records of cows which comprises establishing and maintaining a separate individual record of a cow, including her issue, establishing and maintaining a separate and individual record of the cow from which issue came and of her sire and arranging the individual record of the first mentioned cow adjacent the individual records of the second named cow and sire, and photographing such arrangement to make a permanent record thereof.

5. The process of making permanent pedigree records which comprises establishing and maintaining a separate and individual record of a bull, such record including data regarding its issue, establishing and maintaining a separate and individual record of a cow which has been calfed by said bull, establishing and maintaining separate and individual records of the calf, and arranging the said individual records in a position to be photographed with a record of the calf following that of the bull and the cow in readable relation, and making a photograph of the arrangement, thus establishing a permanent record.

6. The process of making permanent pedigree records which comprises establishing and maintaining separate and individual records of ancestors and descendants and arranging the individual records in readable relation to each other in direct order of consanguinity and making a photograph of the arrangement, thus establishing a permanent record.

7. A pedigree record comprising a sheet containing photographic reproductions of individual records of animals, with the individual records of said sheet in echelon arrangement.

In testimony whereof, I affix my signature hereto.

ROY R. GRAVES.